United States Patent
Kleen

(10) Patent No.: US 9,384,037 B2
(45) Date of Patent: Jul. 5, 2016

(54) MEMORY OBJECT REFERENCE COUNT MANAGEMENT WITH IMPROVED SCALABILITY

(71) Applicant: Andreas Kleen, Portland, OR (US)

(72) Inventor: Andreas Kleen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 152 days.

(21) Appl. No.: 13/993,628

(22) PCT Filed: Mar. 14, 2013

(86) PCT No.: PCT/US2013/031219
§ 371 (c)(1),
(2) Date: Jun. 12, 2013

(87) PCT Pub. No.: WO2014/142861
PCT Pub. Date: Sep. 18, 2014

(65) Prior Publication Data
US 2014/0317352 A1    Oct. 23, 2014

(51) Int. Cl.
*G06F 12/02*    (2006.01)
*G06F 9/46*    (2006.01)
(Continued)

(52) U.S. Cl.
CPC  *G06F 9/467* (2013.01); *G06F 9/06* (2013.01); *G06F 12/0261* (2013.01); *G06F 12/0875* (2013.01); *G06F 12/1466* (2013.01); *G06F 17/30327* (2013.01)

(58) Field of Classification Search
CPC . G06F 12/00; G06F 12/0261; G06F 12/0875; G06F 12/02; G06F 12/08; G06F 12/14; G06F 12/06; G06F 3/06; G06F 21/00; G06F 13/00; G06F 13/28; G06F 9/26; G06F 9/34; G06F 21/79; G06F 12/1441; G06F 12/1433; G06F 12/1491; G06F 21/81; G06F 12/023
See application file for complete search history.

(56) References Cited

U.S. PATENT DOCUMENTS 5,687,368 A * 11/1997 Nilsen
5,857,210 A *  1/1999 Tremblay ............ G06F 12/0269
(Continued)

FOREIGN PATENT DOCUMENTS

WO    2010/082604 A1    7/2010

OTHER PUBLICATIONS

International Preliminary Report on Patentability received for PCT Application No. PCT/US2013/031219, issued on Sep. 15, 2015.
(Continued)

*Primary Examiner* — Jared Rutz
*Assistant Examiner* — Jean Edouard
(74) *Attorney, Agent, or Firm* — Grossman, Tucker, Perreault & Pfleger, PLLC

(57) ABSTRACT

Generally, this disclosure provides systems, devices, methods and computer readable media for memory object reference count management with improved scalability based on transactional reference count elision. The device may include a hardware transactional memory processor configured to maintain a read-set associated with a transaction and to abort the transaction in response to a modification of contents of the read-set by an entity external to the transaction; and a code module configured to: enter the transaction; locate the memory object; read the reference count associated with the memory object, such that the reference count is added to the read-set associated with the transaction; access the memory object; and commit the transaction.

19 Claims, 6 Drawing Sheets

(51) Int. Cl.
*G06F 9/06* (2006.01)
*G06F 12/08* (2016.01)
*G06F 12/14* (2006.01)
*G06F 17/30* (2006.01)

(56) References Cited

U.S. PATENT DOCUMENTS

| | | | |
|---|---|---|---|
| 5,873,105 A * | 2/1999 | Tremblay et al. | |
| 6,363,403 B1 * | 3/2002 | Roy | G06F 12/0261 |
| 7,089,272 B1 * | 8/2006 | Garthwaite et al. | |
| 7,188,129 B2 * | 3/2007 | Garthwaite | |
| 7,209,935 B2 * | 4/2007 | Garthwaite | |
| 7,404,182 B1 * | 7/2008 | Garthwaite et al. | 717/140 |
| 7,676,801 B1 * | 3/2010 | Garthwaite | 717/165 |
| 7,716,377 B2 * | 5/2010 | Harris et al. | 709/248 |
| 8,140,773 B2 * | 3/2012 | Saha et al. | 711/145 |
| 8,291,187 B2 * | 10/2012 | Johnson | 711/170 |
| 8,898,376 B2 * | 11/2014 | Aune | 711/103 |
| 2002/0056025 A1 * | 5/2002 | Qiu | G06F 12/123 711/133 |
| 2005/0102250 A1 * | 5/2005 | Carr | G06F 9/466 |
| 2007/0113014 A1 * | 5/2007 | Manolov et al. | 711/133 |
| 2007/0288708 A1 * | 12/2007 | Saha et al. | 711/159 |
| 2008/0256074 A1 * | 10/2008 | Lev | G06F 9/466 |
| 2009/0006405 A1 * | 1/2009 | Detlefs | G06F 9/467 |
| 2009/0182783 A1 * | 7/2009 | Lomet | G06F 17/30353 |
| 2009/0248985 A1 * | 10/2009 | Ayguade | G06F 8/4442 711/125 |
| 2010/0162250 A1 * | 6/2010 | Adl-Tabatabai et al. | 718/101 |
| 2011/0125973 A1 * | 5/2011 | Lev et al. | 711/153 |
| 2011/0246725 A1 * | 10/2011 | Moir | G06F 11/141 711/147 |
| 2011/0246727 A1 * | 10/2011 | Dice | G06F 12/0261 711/150 |
| 2012/0254846 A1 * | 10/2012 | Moir | G06F 9/467 717/152 |
| 2012/0310987 A1 * | 12/2012 | Dragojevic | G06F 9/467 707/792 |
| 2013/0238579 A1 * | 9/2013 | Gray | G06F 9/3004 707/703 |
| 2013/0275715 A1 * | 10/2013 | Caprioli et al. | 711/203 |
| 2014/0237004 A1 * | 8/2014 | Schreter | G06F 17/30303 707/813 |

OTHER PUBLICATIONS

International Search Report with Written Opinion received for PCT Application No. PCT/US2013/031219, mailed on Dec. 30, 2013, 12 pages.

* cited by examiner

MEMORY OBJECT REFERENCE COUNT MANAGEMENT WITH IMPROVED SCALABILITY

FIELD

The present disclosure relates to memory object reference count management, and more particularly, to memory object reference count management with improved scalability employing transactional reference count elision.

BACKGROUND

Memory management systems typically keep track of memory objects after they are created and delete those objects when they are no longer needed so that the memory may be freed for re-use. These systems, which are sometimes also known as garbage collectors, often work by maintaining a reference count that is associated with each memory object, for example when that object is created or allocated in memory. The reference count is incremented when a thread (or process or other entity) accesses or otherwise references that memory object. The reference count is decremented when the thread deletes or de-references the memory object. When the reference count reaches zero, the memory object is assumed to no longer be in use and the memory manager may free the memory for re-use (although not required to) and thus reduce the possibility of running out of memory.

Additionally, computing systems often have multiple processing cores over which a given workload may be distributed to increase computational throughput. Each core may have an associated memory cache that operates at a higher speed than the main memory. When multiple threads are executing on different processor cores and accessing, or sharing, a common memory object, the reference count for that object will typically need to be transferred from one cache to another, which may result in increased latencies and reduced processing efficiency. As the computing system scales upwards in size, to greater numbers of cores and threads executing in parallel, the memory management problems associated with reference count swapping from cache to cache may result in decreased performance that impedes scalability.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art.

DETAILED DESCRIPTION

Generally, this disclosure provides systems, devices, methods and computer readable media for memory object reference count management with improved scalability based on transactional reference count elision. Reference count elision (e.g., the elimination or reduction of modifications to memory object reference counts, used for memory management purposes) may be accomplished with hardware transaction monitoring, as will be explained below. Reference count elision avoids the latency that may be incurred by the transfer of these reference counts between processor core cache memories, which would otherwise result from reference count modifications. Transactional reference count elision thus improves performance and scalability, with increasing numbers of processor cores, by eliminating unnecessary cache transfers, of the reference counts, between the cores.

In some embodiments, the processor may support hardware transaction monitoring through an instruction set architecture extension that provides instructions to begin (or enter) a transaction region of code, to exit (or commit) the transaction region and to handle an abort of the transaction region. The transaction monitor may buffer the side effects of memory accesses, performed by code within the transaction region, until the transaction exits or commits. If the transaction aborts before committing, however, for example due to a memory conflict with another code entity or thread, the buffered side effects are discarded (e.g., the transaction is rolled back) and alternative code may be executed to handle the abort condition.

A read access of a reference count, by a thread that is executing within a transaction region, extends the transaction region memory monitoring to the reference count which allows it to remain in a shared cache state since the reference count is only being read rather than written to. This enables protection of the reference count as well as the associated memory object as will be explained in greater detail below. Although the cache line (or memory block) containing the reference count may still have been transferred, that fact that it remains in a shared state (for example, within a cache management state machine) allows other processor cores to avoid having to give up the cache line which could suspend parallel execution.

Figure 1:
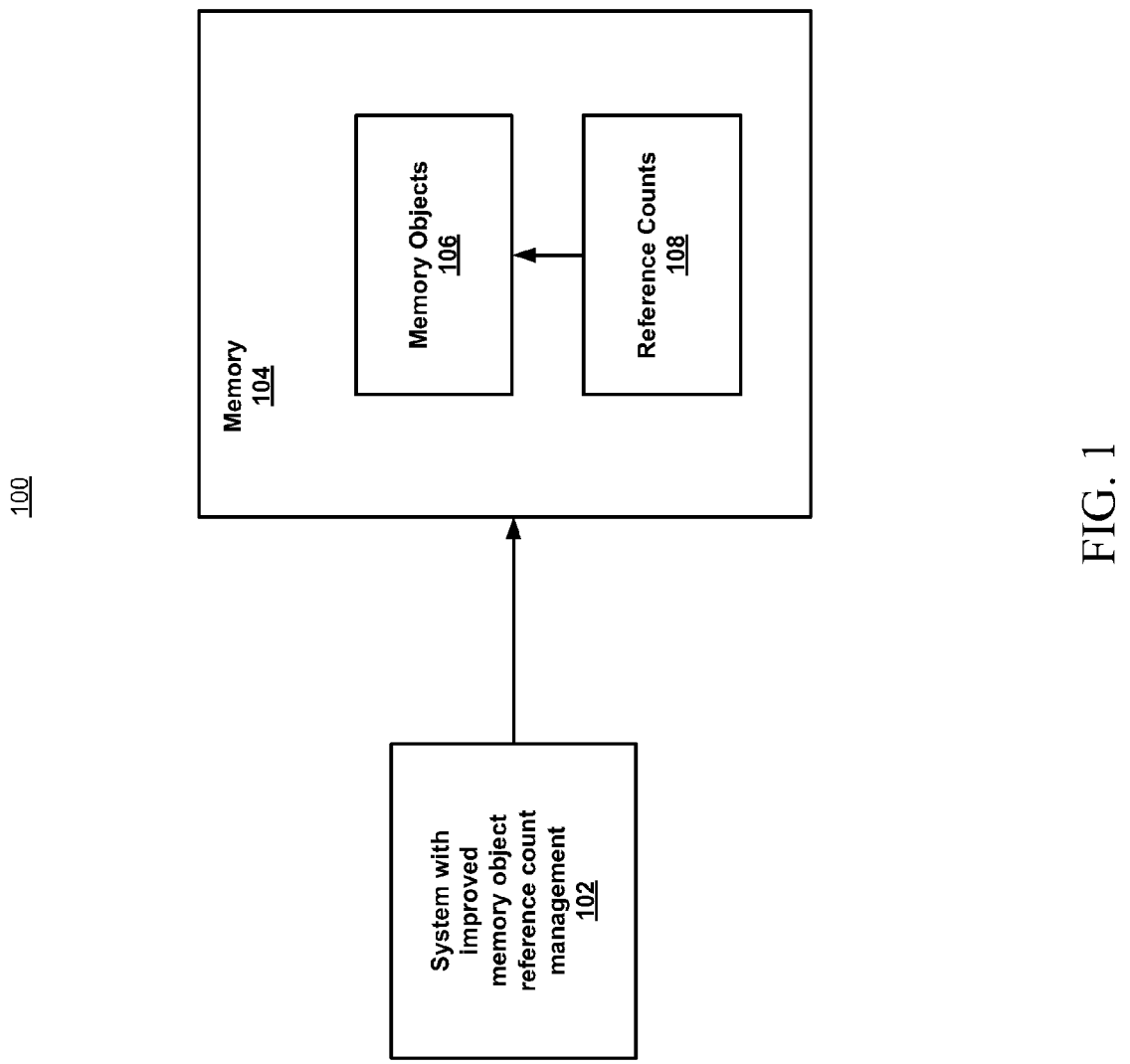
FIG. 1 illustrates a top level system diagram of one exemplary embodiment consistent with the present disclosure.

FIG. 1 illustrates a top level system diagram 100 of one exemplary embodiment consistent with the present disclosure. A system with improved memory object reference count management 102 is shown configured to interact with a memory 104. The memory 104 may be shared between multiple processors or processor cores and may store memory object 106 and associated reference counts 108. In some embodiments, the memory objects 106 may be included in data structures, such as, for example, hash tables, trees, arrays and/or lists. The reference counts 108 may be used for memory management purposes to indicate the number of threads or other code entities that are using or referring to the memory objects at any time, to prevent the memory objects from being deleted (and the associated memory freed) until they are no longer in use. System 102 may be configured for transactional reference count elision to reduce transfers of the reference counts between processor core cache memories and the associated transfer latencies.

Figure 2:
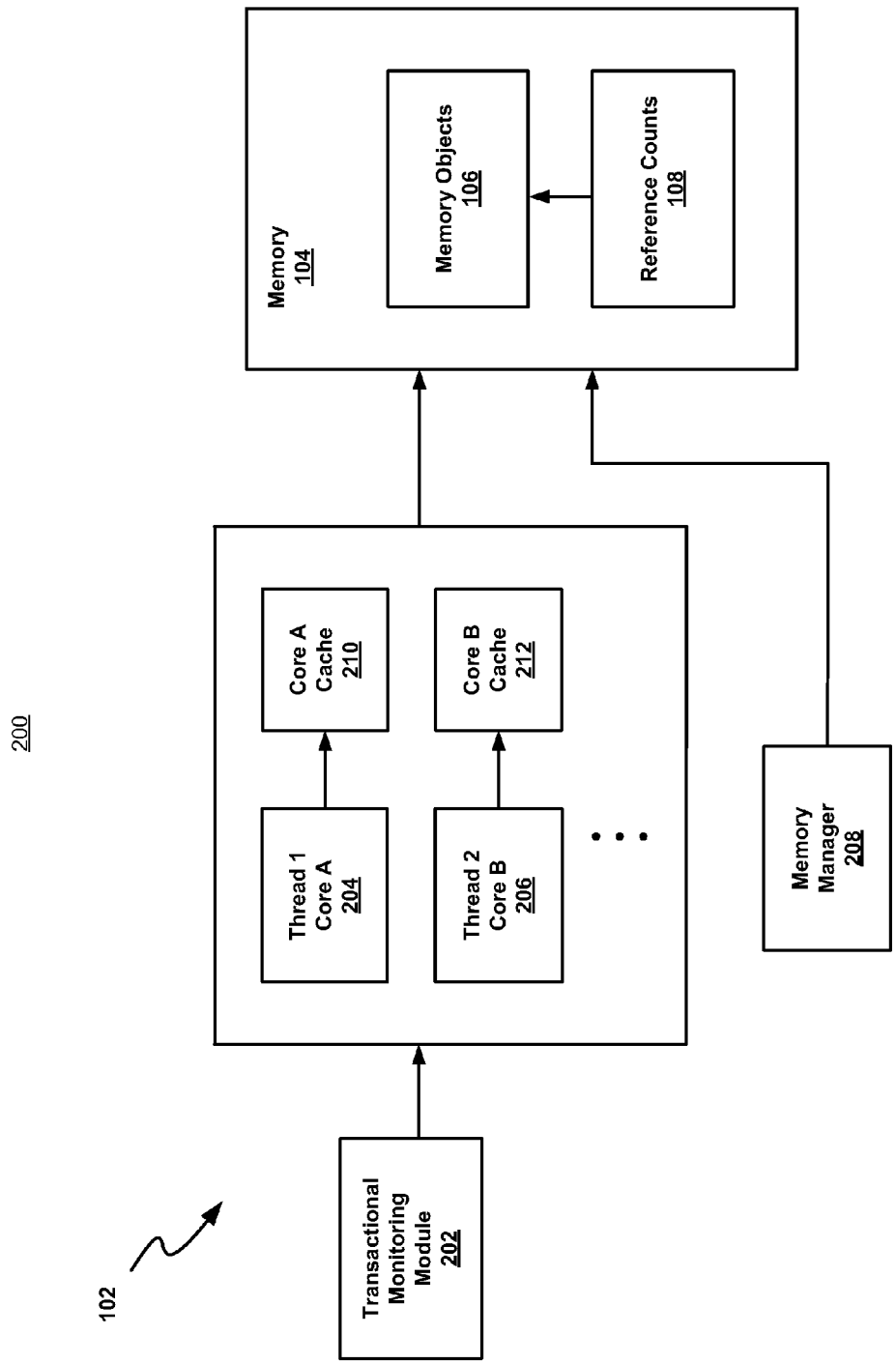
FIG. 2 illustrates a block diagram of one exemplary embodiment consistent with the present disclosure.

FIG. 2 illustrates a block diagram 200 of one exemplary embodiment consistent with the present disclosure. The system with improved memory object reference count management 102 is shown to include a transactional monitoring module 202, a memory manager module 208, and a number of processing cores configured to execute threads or other code entities, for example, core A 204 and core B 206. Each core may be further configured with a cache memory 210, 212. Memory 104 is also shown to include memory objects 106 and associated reference counts 108.

Memory manager 208 may be configured to track of memory objects after they are created and delete those objects when they are no longer needed so that the memory may be freed for re-use. This may be accomplished by maintaining a reference count for each memory object, for example when that object is created or allocated in memory. The reference count is incremented when a thread (code module, process or other entity) accesses or otherwise references that memory object. The reference count is decremented when the thread de-references the memory object. When the reference count reaches zero, or some threshold value, the memory object may be assumed to no longer be in use and the memory manager (e.g., garbage collector) can delete the object and free the memory associated with that object.

Transactional monitoring module 202 may be configured to provide instructions that enable a region of code to begin (or enter) a transaction, to exit (or commit) the transaction and to handle an abort of the transaction. The transaction monitor 202 maintains a read-set of memory objects that are accessed by code executing within a transaction region. These memory objects in the read-set are monitored and the transaction monitor 202 may buffer the side effects of memory accesses to these objects (e.g., modifications), performed by code within the transaction region, until the transaction exits or commits, at which time they become effective and visible to other threads. If the transaction aborts before committing, however, for example due to a memory conflict with another code entity or thread, the buffered side effects are discarded (e.g., the transaction is rolled back) and alternative code may be executed to handle the abort condition.

Threads or code modules executing on the multiple cores 204, 206 may be configured to enter a transaction region when working with memory objects 106. While in the transaction region the threads may perform a read access of the reference count 108 associated with the memory object 106. The transactional monitoring module 202 may be configured to detect this read access and consequently add the reference count to the read-set of objects to be monitored or protected. Since the reference count is now in the read-set, the need to increment (and later decrement) the reference count is avoided and reference count elision is achieved in these cases reducing the occurrence of cache memory transfers and associated latencies since the cache may remain in a shared state. If the memory manager 208 were to attempt to delete the memory object and/or free the memory, the transaction monitor 202 would detect it and abort the threads executing in the transaction region. The abort would then cause the threads to invoke a transaction abort handler which may be configured to execute the less efficient fall back approach of incrementing and decrementing reference counts. This would, however, occur with reduced frequency compared to the typical operations. In some embodiments, the abort code may be configured to retry the transaction some number of times before reverting to the fall back approach.

Figure 3:
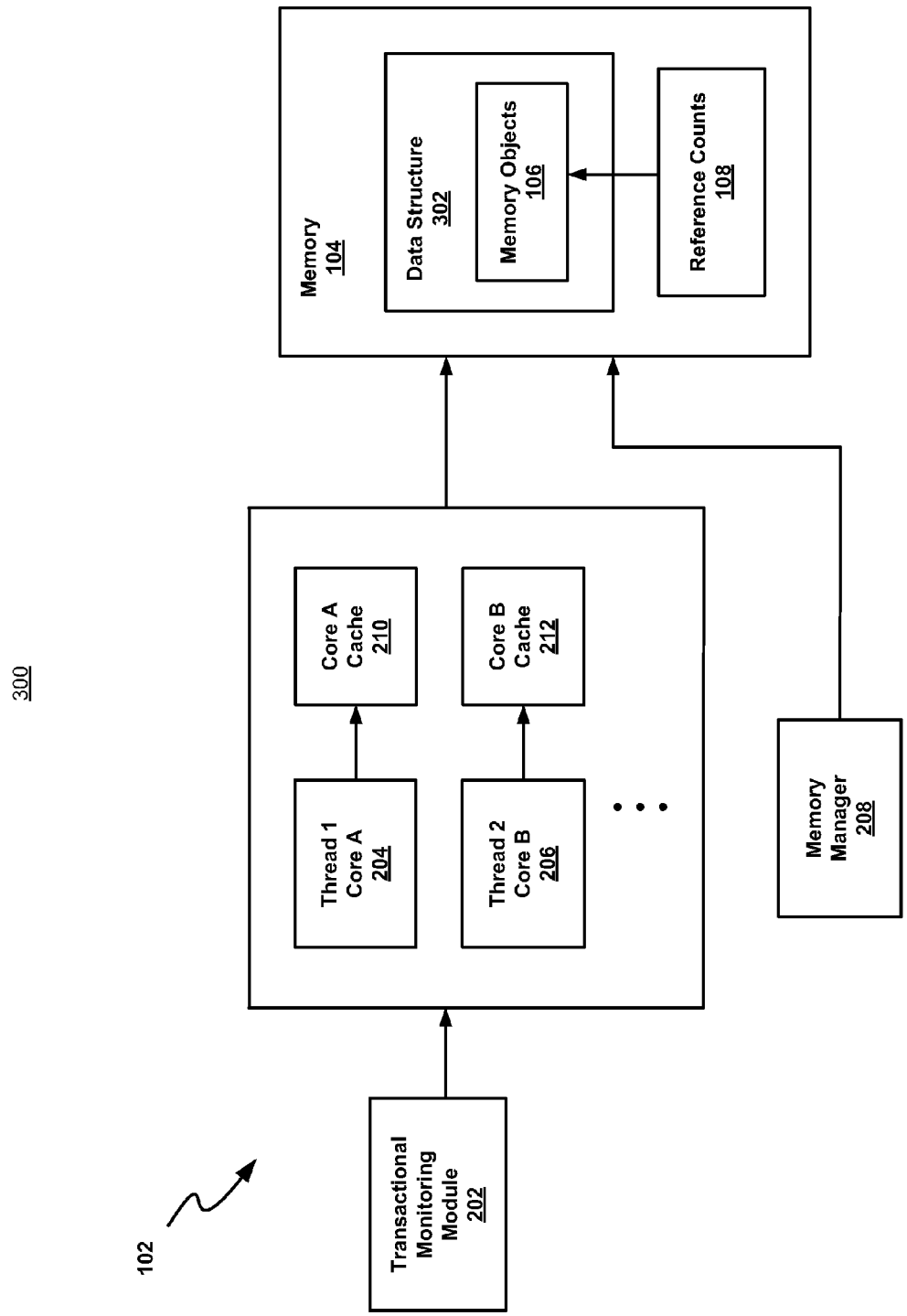
FIG. 3 illustrates a block diagram of another exemplary embodiment consistent with the present disclosure.

FIG. 3 illustrates a block diagram 300 of another exemplary embodiment consistent with the present disclosure. The system with improved memory object reference count management 102 is shown again, as in FIG. 2. In this embodiment, however, the memory objects 106 are shown to be included as part of a data structure 302. The data structure 302 may be any type of data structure, such as, for example, a hash table, a tree, an array, a list or a pointer object. In some embodiments, an elided lock may be used to lock the data structure prior to accessing the memory object to avoid incurring the expense of additional cache transfers. In some embodiments, other suitable lock-less synchronization techniques may be employed on the data structure.

Figure 4:
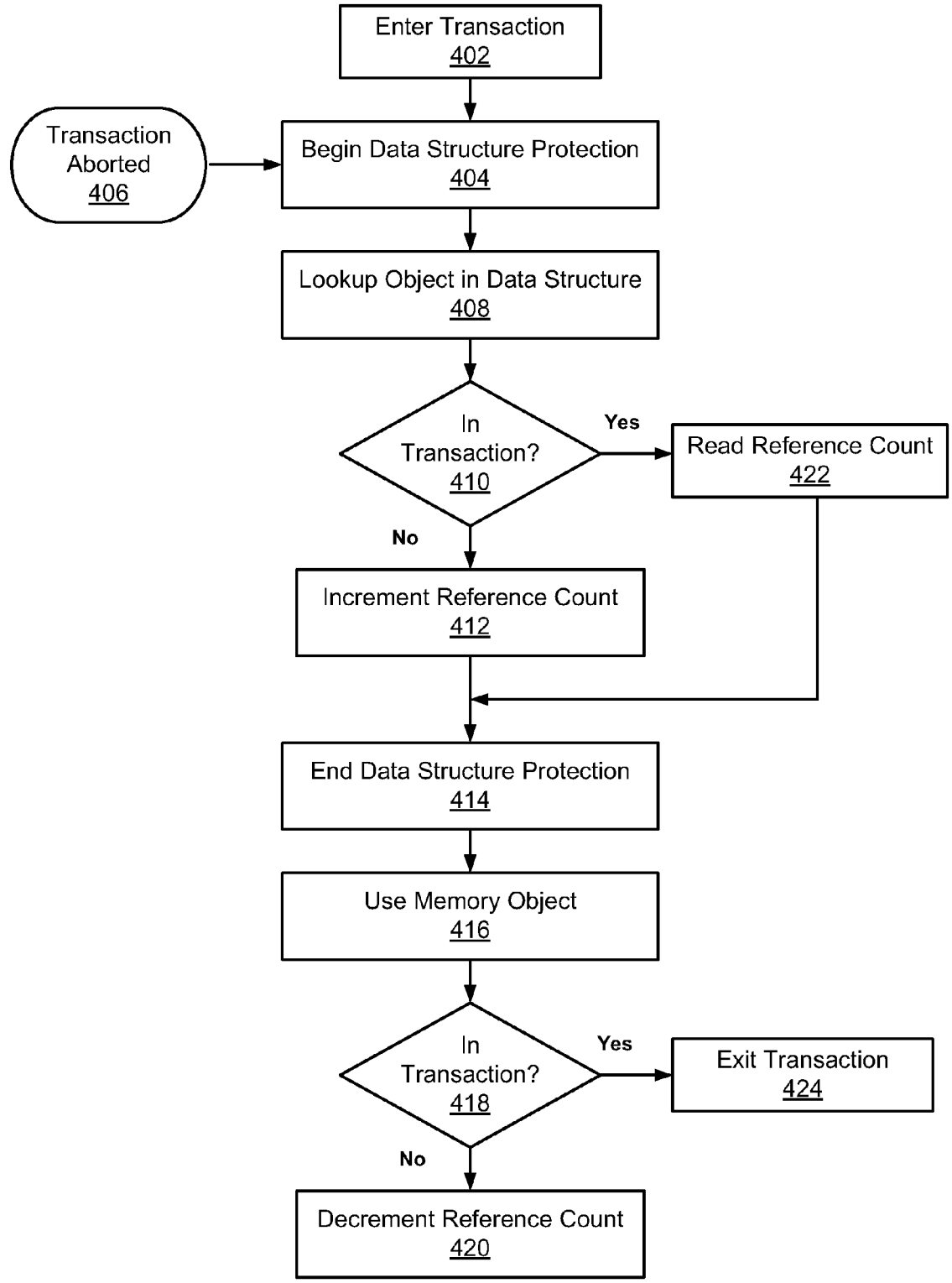
FIG. 4 illustrates a flowchart of operations of one exemplary embodiment consistent with the present disclosure.

FIG. 4 illustrates a flowchart of operations 400 of one exemplary embodiment consistent with the present disclosure. The operations provide a method for memory object reference count management based on transactional reference count elision. At operation 402, a thread enters a region of code associated with the transaction. At operation 404, a data structure is protected, preferably employing an elided lock to avoid additional cache transfers. At operation 408, a memory object is looked up in the data structure. At operation 410, a test is performed to determine whether the thread is executing within a transaction region. If the thread is executing in a transaction region (as would be the case, for example, if this section of code were entered through operation 402), the reference count associated with the memory object is read, at operation 422, causing the transaction processor to add the reference count to the read-set associated with the transaction region. If the thread is not in a transaction region (as would be the case, for example, if this section of code were entered from an aborted transaction at operation 406), the reference count associated with the memory object is incremented at operation 412. At operation 414, the data structure protection is removed. At operation 416, the memory object is used for any desired purpose. At operation 416, a test is again performed to determine whether the thread is executing within a transaction region, and if so, the transaction is committed (e.g., transaction region exited) at operation 424. If the thread is not in a transaction region, the reference count is decremented at operation 420.

If, at any point, the transaction is aborted, the code associated with this method is re-entered at operation 406 in a non-transactional mode. In some embodiments, a transaction abort may be followed by one or more retries in the transactional mode prior to a re-entry in the non-transactional mode.

In some embodiment, transaction regions, that may have been created for other purposes, may be re-used or combined in any suitable way.

Figure 5:
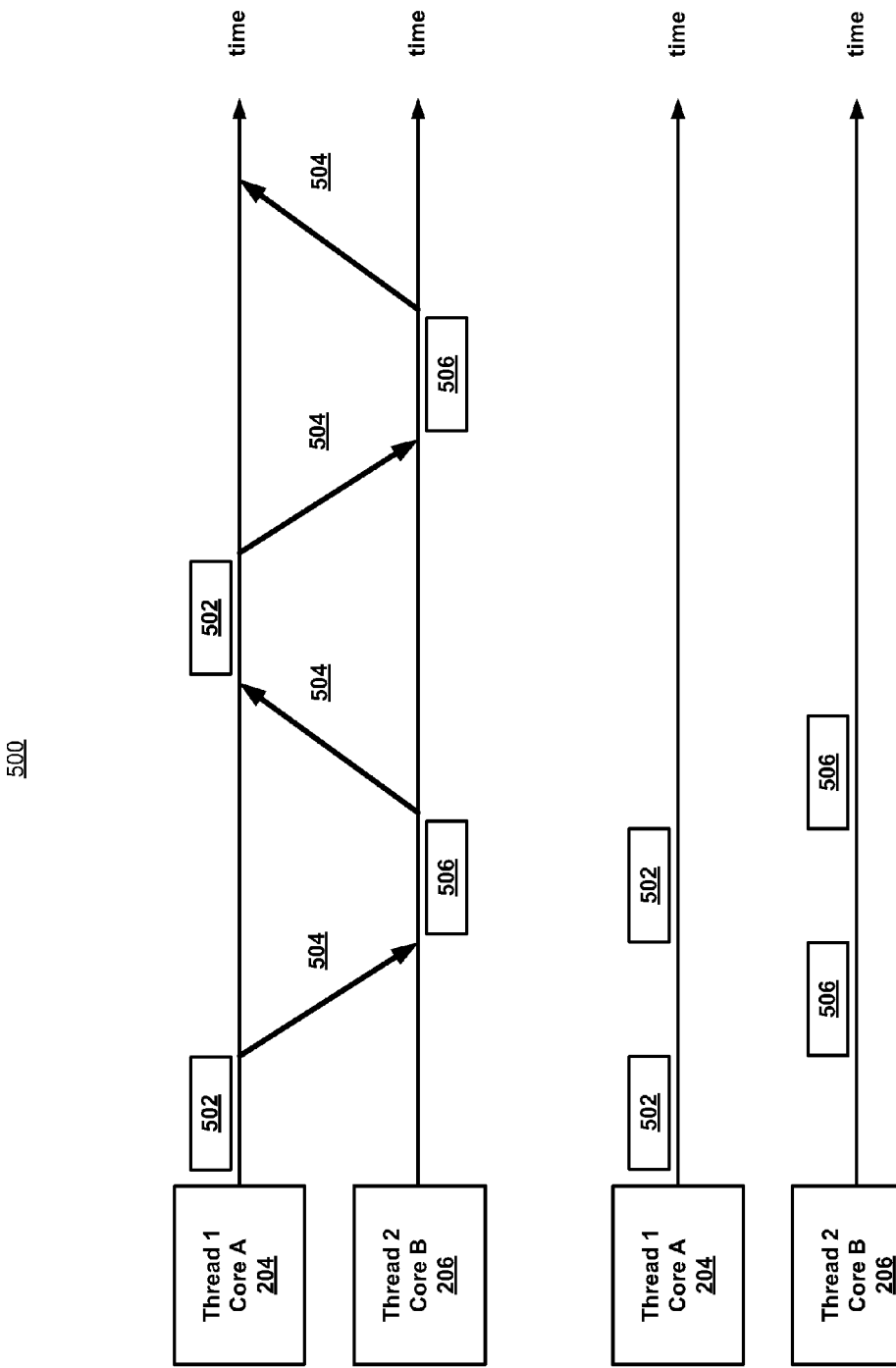
FIG. 5 illustrates a timing diagram of one exemplary embodiment consistent with the present disclosure.

FIG. 5 illustrates a timing diagram 500 of one exemplary embodiment consistent with the present disclosure. This diagram illustrates the potential advantage of transactional reference count elision. In the top two timelines, work is performed over a first time period 502 on a memory object by thread 1 executing on core A 204, and work is performed over a second time period 506 on the same memory object by thread 2 executing on core B 206. A time latency 504 results from the transfer of the reference count associated with the memory object from core A cache memory to core B cache memory when transactional reference count elision is not used. The time latency 504 causes processing delay, which may increase with the number of cores being used. In the bottom two timelines, work is performed over a first time period 502 on a memory object by thread 1 executing on core A 204, and work is performed over a second time period 506 on the same memory object by thread 2 executing on core B 206. In this case, however, transactional reference count elision is used and the time latency 504 is avoided because the reference counts need not be modified. As a result, software scalability is improved for larger multi-core systems.

Figure 6:
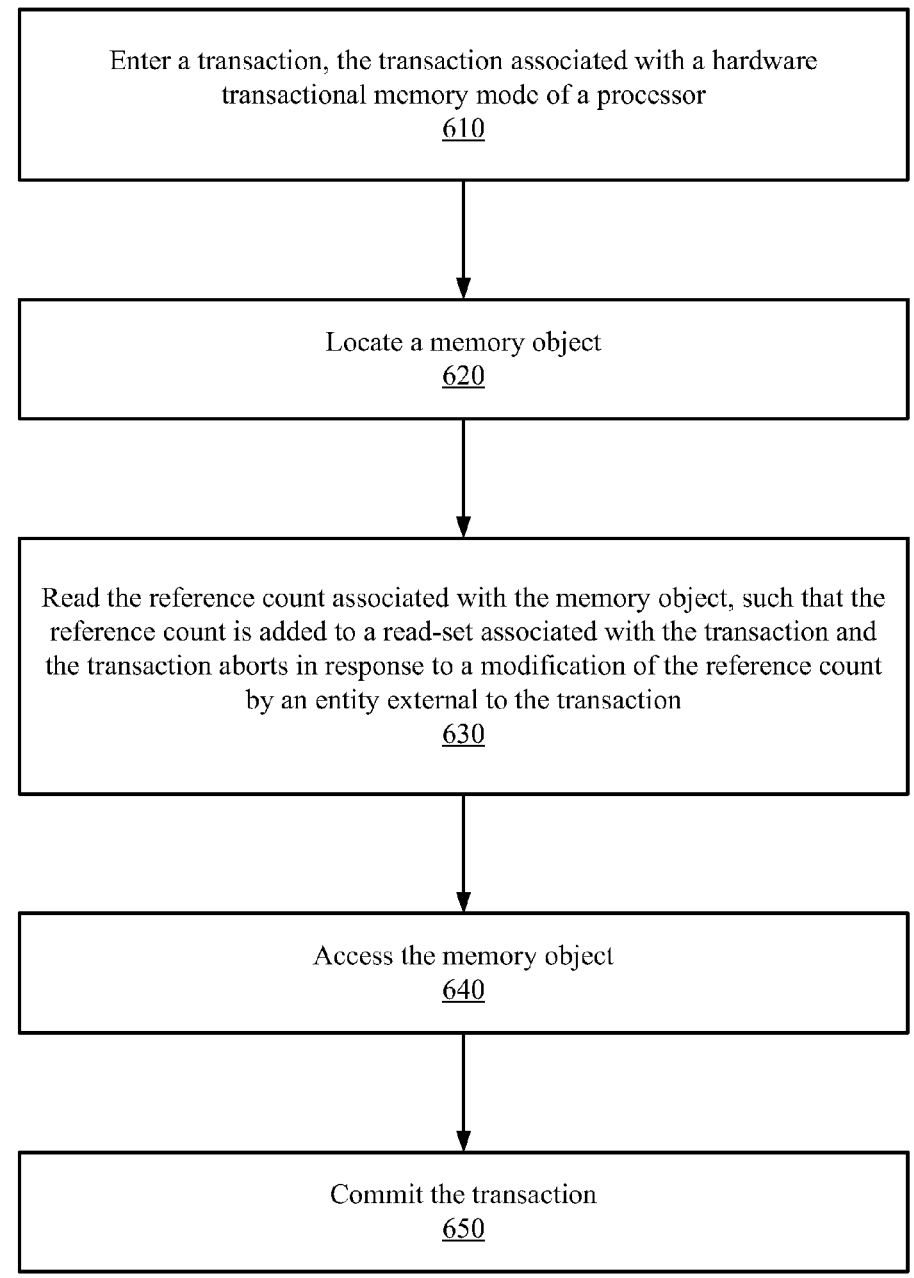
FIG. 6 illustrates a flowchart of operations of another exemplary embodiment consistent with the present disclosure.

FIG. 6 illustrates a flowchart of operations 600 of another exemplary embodiment consistent with the present disclosure. The operations provide a method for memory object reference count management based on transactional reference count elision. At operation 610, a transaction is entered. The transaction may be a region of code and may be associated with a hardware transactional memory mode of a processor or processor core. At operation 620, a memory object is located. The memory object may be included in a data structure. At operation 630, the reference count associated with the memory object is read causing the reference count to be added to a read-set associated with the transaction. The transaction may therefore abort in response to a modification of the reference count by an entity external to the transaction. At operation 640, the memory object is accessed and at operation 650, the transaction is committed.

Embodiments of the methods described herein may be implemented in a system that includes one or more storage mediums having stored thereon, individually or in combination, instructions that when executed by one or more processors perform the methods. Here, the processor may include, for example, a system CPU (e.g., core processor) and/or programmable circuitry. Thus, it is intended that operations according to the methods described herein may be distributed across a plurality of physical devices, such as processing structures at several different physical locations. Also, it is intended that the method operations may be performed individually or in a subcombination, as would be understood by one skilled in the art. Thus, not all of the operations of each of the flow charts need to be performed, and the present disclosure expressly intends that all subcombinations of such operations are enabled as would be understood by one of ordinary skill in the art.

The storage medium may include any type of tangible medium, for example, any type of disk including floppy disks, optical disks, compact disk read-only memories (CD-ROMs), compact disk rewritables (CD-RWs), digital versatile disks (DVDs) and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

"Circuitry", as used in any embodiment herein, may include, for example, singly or in any combination, hardwired circuitry, programmable circuitry, state machine circuitry, and/or firmware that stores instructions executed by programmable circuitry. An app may be embodied as code or instructions which may be executed on programmable circuitry such as a host processor or other programmable circuitry. A module, as used in any embodiment herein, may be embodied as circuitry. The circuitry may be embodied as an integrated circuit, such as an integrated circuit chip.

Thus, the present disclosure provides systems, devices, methods and computer readable media for memory object reference count management with improved scalability based on transactional reference count elision. The following examples pertain to further embodiments.

The device may include a hardware transactional memory processor configured to maintain a read-set associated with a transaction and to abort the transaction in response to a modification of contents of the read-set by an entity external to the transaction. The device of this example may also include a code module configured to: enter the transaction; locate the memory object; read the reference count associated with the memory object, such that the reference count is added to the read-set associated with the transaction; access the memory object; and commit the transaction.

Another example device includes the forgoing components and the code module is further configured to, in response to the transaction abort: locate the memory object; increment the reference count; access the memory object; and decrement the reference count.

Another example device includes the forgoing components and further includes a memory management module configured to free the memory object in response to the reference count reaching a threshold value.

Another example device includes the forgoing components and the threshold value is zero.

Another example device includes the forgoing components and further includes a plurality of processing cores, and the code module is a first thread executing on a first of the processing cores and the external entity is a second thread executing on a second of the processing cores.

Another example device includes the forgoing components and further includes a cache memory associated with each of the processing cores, and the reference count is stored in the cache memory.

According to another aspect there is provided a method. The method may include entering a transaction, the transaction associated with a hardware transactional memory mode of a processor. The method of this example may also include locating the memory object. The method of this example may further include reading the reference count associated with the memory object, such that the reference count is added to a read-set associated with the transaction, and the transaction aborts in response to a modification of the reference count by an entity external to the transaction. The method of this example may further include accessing the memory object. The method of this example may further include committing the transaction.

Another example method includes the forgoing operations and further includes, in response to the abort of the transaction: locating the memory object; incrementing the reference count; accessing the memory object; and decrementing the reference count.

Another example method includes the forgoing operations and the memory object is an element of a data structure.

Another example method includes the forgoing operations and the data structure is a hash table, a tree, an array or a list.

Another example method includes the forgoing operations and further includes locking the memory object during the reading of the reference count, the locking employing an elided lock.

Another example method includes the forgoing operations and further includes freeing the memory object in response to the reference count reaching a threshold value.

Another example method includes the forgoing operations and the threshold value is zero.

Another example method includes the forgoing operations and the reference count is in a cache memory.

According to another aspect there is provided a system. The system may include a means for entering a transaction, the transaction associated with a hardware transactional memory mode of a processor. The system of this example may also include a means for locating the memory object. The system of this example may further include a means for reading the reference count associated with the memory object, such that the reference count is added to a read-set associated with the transaction, and the transaction aborts in response to a modification of the reference count by an entity external to the transaction. The system of this example may further include a means for accessing the memory object. The system of this example may further include a means for committing the transaction.

Another example system includes the forgoing components and further includes, in response to the abort of the transaction a means for locating the memory object; a means for incrementing the reference count; a means for accessing the memory object; and a means for decrementing the reference count.

Another example system includes the forgoing components and the memory object is an element of a data structure.

Another example system includes the forgoing components and the data structure is a hash table, a tree, an array or a list.

Another example system includes the forgoing components and further includes a means for locking the memory object during the reading of the reference count, the locking employing an elided lock.

Another example system includes the forgoing components and further includes a means for freeing the memory object in response to the reference count reaching a threshold value.

Another example system includes the forgoing components and the threshold value is zero.

Another example system includes the forgoing components and the reference count is in a cache memory.

According to another aspect there is provided at least one computer-readable storage medium having instructions stored thereon which when executed by a processor, cause the processor to perform the operations of the method as described in any of the examples above.

According to another aspect there is provided an apparatus including means to perform a method as described in any of the examples above.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A device for memory object reference count elision, said device comprising:
    a hardware transactional memory processor configured to maintain a read-set that includes a memory object accessed by code executing within a transaction region and associated with a transaction and to abort said transaction in response to a modification of the memory object included in said read-set by an entity external to said transaction;
    wherein said hardware transactional memory processor permits said code executing in said transaction region to:
        enter said transaction;
        locate said memory object; and
        access said memory object;
        wherein in response to said transaction being within a transaction region, said hardware transactional memory processor permits said code executing in said transaction region to further:
            read a reference count associated with said memory object, such that said reference count is added to said read-set associated with said transaction; and
            commit said transaction; and
        wherein in response to said modification of said memory object included in said read-set by said entity external to said transaction and said transaction abort, said code executing in said transaction region to further:
            increment said reference count; and
            decrement said reference count.

2. The device of claim 1, further comprising a memory management module configured to free said memory object in response to said reference count reaching a threshold value.

3. The device of claim 2, wherein said threshold value is zero.

4. The device of claim 1, further comprising a plurality of processing cores, wherein said code module is a first thread executing on a first of said processing cores and said external entity is a second thread executing on a second of said processing cores.

5. The device of claim 1, further comprising a cache memory associated with each of said processing cores, wherein said reference count is stored in said cache memory.

6. A method for memory object reference count elision, said method comprising:
    entering a transaction, said transaction associated with a hardware transactional memory mode of a processor executing code in a transaction region;
    locating a memory object in said transaction region;
    accessing said memory object;
    wherein in response to said transaction being within a transaction region, said method further comprises:
        reading said reference count associated with said memory object, such that said reference count is added to a read-set that includes a memory object accessed by code executing within a transaction region and associated with said transaction, wherein said transaction aborts in response to a modification of said reference count by an entity external to said transaction; and
        committing said transaction;
    wherein in response to said modification of contents of said memory object included in said read-set by said entity external to said transaction and said transaction abort, said method further comprises:
        incrementing said reference count; and
        decrementing said reference count.

7. The method of claim 6, wherein said memory object is an element of a data structure.

8. The method of claim 7, wherein said data structure is a hash table, a tree, an array or a list.

9. The method of claim 6, further comprising locking said memory object during said reading of said reference count, said locking employing an elided lock.

10. The method of claim 6, further comprising freeing said memory object in response to said reference count reaching a threshold value.

11. The method of claim 10, wherein said threshold value is zero.

12. The method of claim 6, wherein said reference count is in a cache memory.

13. One or more non-transitory computer-readable storage memories having instructions stored thereon which when executed by a processor result in the following operations for memory object reference count elision, said operations comprising:
    entering a transaction, said transaction associated with a hardware transactional memory mode of a processor executing code in a transaction region;
    locating a memory object in said transaction region;
    accessing said memory object;

wherein in response to said transaction being within a transaction region, said operation further comprising:
    reading said reference count associated with said memory object, such that said reference count is added to a read-set that includes a memory object accessed by code executing within a transaction region and associated with said transaction, wherein said transaction aborts in response to a modification of said reference count by an entity external to said transaction; and
committing said transaction;
wherein in response to said modification of contents of said memory object included in said read-set by said entity external to said transaction and said transaction abort, said operations further comprising:
    incrementing said reference count; and
    decrementing said reference count.

14. The one or more non-transitory computer-readable storage memories of claim 13, wherein said memory object is an element of a data structure.

15. The one or more non-transitory computer-readable storage memories of claim 14, wherein said data structure is a hash table, a tree, an array or a list.

16. The one or more non-transitory computer-readable storage memories of claim 13, further comprising the operation of locking said memory object during said reading of said reference count, said locking employing an elided lock.

17. The one or more non-transitory computer-readable storage memories claim 13, further comprising the operation of freeing said memory object in response to said reference count reaching a threshold value.

18. The one or more non-transitory computer-readable storage memories of claim 17, wherein said threshold value is zero.

19. The one or more non-transitory computer-readable storage memories of claim 13, wherein said reference count is in a cache memory.

\* \* \* \* \*